United States Patent
De Wergifosse et al.

(10) Patent No.: US 12,330,769 B2
(45) Date of Patent: Jun. 17, 2025

(54) ELECTROHYDRAULIC PITCH SETTING WITH REVERSIBLE PUMP

(71) Applicant: Safran Aircraft Engines, Paris (FR)

(72) Inventors: Huguette De Wergifosse, Moissy-Cramayel (FR); Caroline Marie Frantz, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 51 days.

(21) Appl. No.: 18/564,504

(22) PCT Filed: May 23, 2022

(86) PCT No.: PCT/FR2022/050972
§ 371 (c)(1),
(2) Date: Nov. 27, 2023

(87) PCT Pub. No.: WO2022/248800
PCT Pub. Date: Dec. 1, 2022

(65) Prior Publication Data
US 2024/0253770 A1    Aug. 1, 2024

(30) Foreign Application Priority Data

May 28, 2021 (FR) ..................................... 2105564

(51) Int. Cl.
*B64C 11/38* (2006.01)
*B64C 11/44* (2006.01)
(Continued)

(52) U.S. Cl.
CPC .............. *B64C 11/38* (2013.01); *B64C 11/44* (2013.01); *F01D 7/00* (2013.01); *F04B 1/128* (2013.01);
(Continued)

(58) Field of Classification Search
CPC .. F04B 1/128; F04B 1/16; F04B 1/188; F04B 1/28; F04D 29/323; F04D 29/325;
(Continued)

(56) References Cited

U.S. PATENT DOCUMENTS 2,980,026 A *  4/1961  Pschunder .............. F04B 1/122
                                                417/284
6,767,187 B2 *  7/2004  Franchet ............... F04D 29/323
                                                416/157 R
(Continued)

FOREIGN PATENT DOCUMENTS

CH        514790 A5    10/1971
EP      1 306 558 A1    5/2003
FR        970185 A      1/1951

*Primary Examiner* — Michael Leslie
(74) *Attorney, Agent, or Firm* — BIRCH, STEWART, KOLASCH & BIRCH, LLP

(57) ABSTRACT

The present invention relates to a mechanism for changing the pitch of a propeller of a turbine engine, the mechanism comprising an electrohydraulic actuator that comprises: —an electric machine comprising a rotatable actuator shaft; —a pumping assembly comprising two hydraulic axial piston pumps, each comprising: o a barrel housed in a cavity filled with hydraulic fluid; o a set of cylinders formed in the barrel, each cylinder housing a translatable piston and comprising an inlet port and a delivery port; o and an inclined plate, the plate of a first pump comprising a crescent-shaped inlet port for circulating the hydraulic fluid when the plate is rotated in a first direction, and the plate of a second pump comprising a crescent-shaped inlet port for circulating the hydraulic fluid when the plate is rotated in a second direction.

12 Claims, 4 Drawing Sheets

(51) Int. Cl.
  *F01D 7/00*    (2006.01)
  *F04B 1/128*   (2020.01)
  *F04B 1/16*    (2006.01)
  *F04B 1/188*   (2020.01)
  *F04B 1/28*    (2006.01)

(52) U.S. Cl.
  CPC ................ *F04B 1/16* (2013.01); *F04B 1/188* (2013.01); *F04B 1/28* (2013.01); *F05D 2260/406* (2013.01); *F05D 2260/79* (2013.01)

(58) Field of Classification Search
  CPC ....... F04D 29/36; F04D 29/362; B64C 11/38; B64C 11/385
  See application file for complete search history.

(56) References Cited

U.S. PATENT DOCUMENTS

| | | | |
|---|---|---|---|
| 6,799,953 B2 * | 10/2004 | Nelson | F04B 1/188 123/506 |
| 2014/0193261 A1 | 7/2014 | Frantz et al. | |
| 2018/0128289 A1 | 5/2018 | Goguet-Chapuis et al. | |
| 2024/0239474 A1 * | 7/2024 | De Wergifosse | B64C 11/44 |
| 2024/0253771 A1 * | 8/2024 | De Wergifosse | F15B 1/022 |
| 2025/0042536 A1 * | 2/2025 | Roda | F04B 1/22 |

* cited by examiner

ELECTROHYDRAULIC PITCH SETTING WITH REVERSIBLE PUMP

GENERAL TECHNICAL FIELD

The disclosure relates to the field of turbomachines comprising a propeller or a variable-setting fan. More specifically, the disclosure relates to a system for actuating the pitch of a propeller or a fan of such a turbomachine.

BACKGROUND

Different turbomachine architectures have recourse to a propeller (turboprop, open rotor) or a fan (turbojet engine) with variable setting. This variability allows the turbomachine to adapt to variable flight conditions by maintaining a favorable angle of incidence of the air on the blades. The variability of the setting is particularly necessary for rotors having a low compression ratio, such as the propellers of turboprops and the fans of turbomachines having a high expansion ratio (ratio of the rate of the secondary flow (cool) to the ratio of the primary flow (through the primary body).)

Many pitch change mechanisms have been conceived to vary the setting of the blades of a propeller or of a fan. These mechanisms generally include a setting of the blade in rotation about its main axis by way of a kinematic line, for example a rod-eccentric assembly actuated by an actuator. The actuator is supplied with hydraulic fluid (for example oil) coming from a lubrication unit of the turbomachine. The variation in the delivered hydraulic fluid pressure along with the distribution of the fluid in one or the other of the actuator chambers make it possible to vary the pitch of the blades. In order to transfer the supply of hydraulic fluid of the pitch change mechanism from a fixed frame of reference (lubrication unit) of the turbomachine to a rotating frame of reference (of the fan), an OTB (Oil Transfer Bearing) is generally used. In a manner known per se, the OTB comprises a part which is fixed with respect to a stator part of the turbomachine and which is connected, via dedicated channels, to a servovalve and to a pump, itself connected to the engine lubrication unit comprising an oil tank and a pump, and a rotating part which moves as one part with a rotor part of the turbomachine. However, the OTB is a complex and fragile device, liable to generate malfunctions, particularly significant oil leaks affecting the reliability and the performance of the turbomachine and requiring the installation of scavenge pumps and the overdimensioning of the engine oil system. Moreover, this configuration has limitations regarding operation at low ratings since it is dependent on the rating of the high-pressure body of the turbomachine and can be prone to feeding problems during certain maneuvers since it is dependent on the supply of the engine oil circuit. Finally, this configuration requires a system for protecting it from the closing of the setting of the blades in flight following a hydraulic malfunction. Two systems may be envisioned: a system of locking of the blade pitch ("pitch lock") or a system of counterweights to provide the feathering of the blades (opening of the pitch to limit drag). Both these systems are heavy, complex, expensive and can generate other failure scenarios such as the untimely locking of the setting.

Furthermore, when a non-reversible hydraulic pump is used, it is necessary to use a flow switching valve to allow the pitch change mechanism to modify the pitch in both its directions of movement. Such a switching valve is conventionally driven electrically, and therefore requires, if it is integrated into the propeller, the transfer of the electrical control current from the stator part of the turbomachine to the rotor part (the propeller) of the turbomachine.

In addition, since the starting of the lubrication unit is generally related to the starting of the turbomachine, it is necessary to make provision for auxiliary systems to provide certain protection functions, particularly in the case of an overspeed or an engine shutdown. It is therefore necessary to make provision for a feathering system that functions even in the event of an absence of hydraulic fluid pressure.

Moreover, the pitch change mechanism must be able to ensure the exit from the feathered position with the engine shut down.

SUMMARY

One aim of the disclosure is to make provision for a variable-setting turbomachine which overcomes the drawbacks of the prior art mentioned below.

Another aim of the disclosure is to make provision for an independent pitch change mechanism which dispenses with the difficulties related to the transfer of hydraulic fluid from a fixed frame of reference to a rotary frame of reference.

Another aim of the disclosure is to make provision for a passive pitch change mechanism, i.e. one that does not require any electrical system and controllers for the modification of the pitch setting of a turbomachine propeller (or fan).

Another aim of the disclosure is to make provision for a pitch change mechanism that can be used whatever the operation of the turbomachine, which is moreover capable of fulfilling the functions of protection and feathering of the blades of the propeller/of the fan of the turbomachine, preferably without being dependent on an electric control system.

Another aim of the disclosure is to make provision for a pitch change mechanism which can be implemented in both a turboprop-type or an open rotor-type turbomachine comprising a propeller and a turbojet engine comprising a fan.

For this purpose, the disclosure makes provision, according to a first aspect, for a pitch change mechanism for a turbomachine propeller, said turbomachine comprising a stator part and a rotor part, said pitch change mechanism comprising an electrohydraulic actuator comprising:

an electric machine fixedly mounted on the stator part of the turbomachine and comprising an actuating shaft rotationally movable about an axis of rotation;
   a pumping assembly comprising two axial-piston hydraulic pumps suitable for pressurizing a hydraulic fluid, each hydraulic pump comprising:
      a barrel housed in a cavity filled entirely or partly with hydraulic fluid, the barrel being fixedly connected to the stator part of the turbomachine to prevent its rotation about the actuating shaft;
      a set of cylinders formed inside the barrel, each cylinder housing a piston translationally movable in the cylinder and comprising an intake hole configured to receive hydraulic fluid coming from the cavity, and a discharge hole configured to send hydraulic fluid to an actuator of the propeller;
      a plate inclined with respect to the axis of rotation and rotationally secured to the actuating shaft, each piston bearing on a surface of the plate;
wherein the plate of a first of the pumps comprises a curved intake opening extending circumferentially with respect to the axis of rotation and configured to allow the circulation of the hydraulic fluid from the cavity to the cylinders of the first of the pumps when the plate of said pump is driven in a first direction of rotation, and the plate of a second of the pumps comprises a curved intake opening extending circumferentially with respect to the axis of rotation configured to allow the circulation of the hydraulic fluid from the cavity to the cylinders of the second of the pumps when the plate of said pump is driven in a second direction of rotation opposite to the first direction of rotation.

The disclosure is advantageously completed by the following features, taken alone or in any of their technically possible combinations:

- when the plate of the first pump is driven in the second direction of rotation, the intake hole of the cylinders is shut off by the surface of the plate of the first pump and, when the plate of the second pump is driven in the first direction of rotation, the intake hole of the cylinders is shut off by the surface of the plate of the second pump;
- the discharge holes of the pumps are adjacent and open into a central area of the pumping assembly;
- each cylinder further comprises a discharge valve mounted on the discharge hole and configured to block the circulation of the hydraulic fluid of the actuator in the direction of the cylinder;
- the pitch change mechanism further comprises an annular groove formed in the body of each pump, said annular groove being in fluid communication with the discharge holes of the cylinders of the corresponding pump;
- the actuator of the propeller comprises two chambers, a first of the two chambers being in fluid communication with the annular groove of the first pump, a second of the two chambers being in fluid communication with the annular groove of the second pump;
- the pitch change mechanism further comprises:
  - a first hydraulic valve configured to put the first chamber of the actuator in fluid communication either with the annular groove of the first pump when the actuating shaft is driven in the first direction of rotation, or with a hydraulic accumulator when the actuating shaft is driven in the second direction of rotation; and
  - a second hydraulic valve configured to put the second chamber of the actuator in communication either with the annular groove of the second pump when the actuating shaft is driven in the second direction of rotation or with the hydraulic accumulator when the actuating shaft is driven in the first direction of rotation,
- the first hydraulic valve and the second hydraulic valve are each controlled by a pressure at the discharge hole of the first pump and of the second pump, respectively;
- the electric machine (29) is an asynchronous machine;
- a pitch of the propeller is controlled by torque slaving of the electric machine.

DESCRIPTION OF THE DRAWINGS

Other features and advantages will become apparent on reading the following description of a preferred embodiment. This description will be given with reference to the appended drawings wherein.

DETAILED DESCRIPTION

Figure 1:
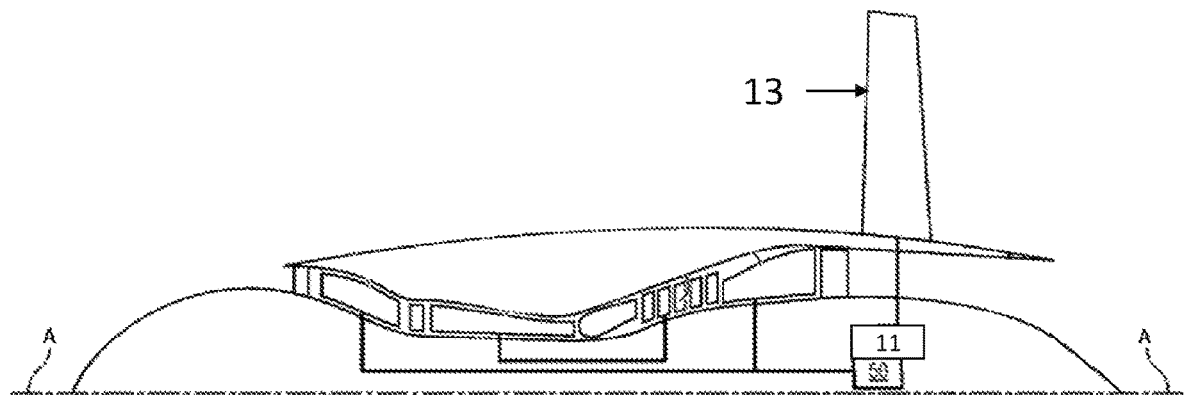
FIG. 1 is a schematic section view of an example of a turbomachine comprising a fan or a propeller with variable setting and a pitch change mechanism in accordance with an embodiment.

This disclosure is applicable to any turbomachine with variable setting comprising a pitch change mechanism. In particular, the disclosure relates to both bypass turbojet engines comprising a fan and turbomachines with propellers such as turboprops or else open rotors (unducted propeller) as shown in FIG. 1, in which the pitch of the blades of the fan or of the propeller is modifiable according to the flight conditions. In the remainder of the application, for the sake of simplicity in the description and claims, the term "propeller" will be used to denote either a propeller as described above or a fan of a turbojet engine.

Figure 2:
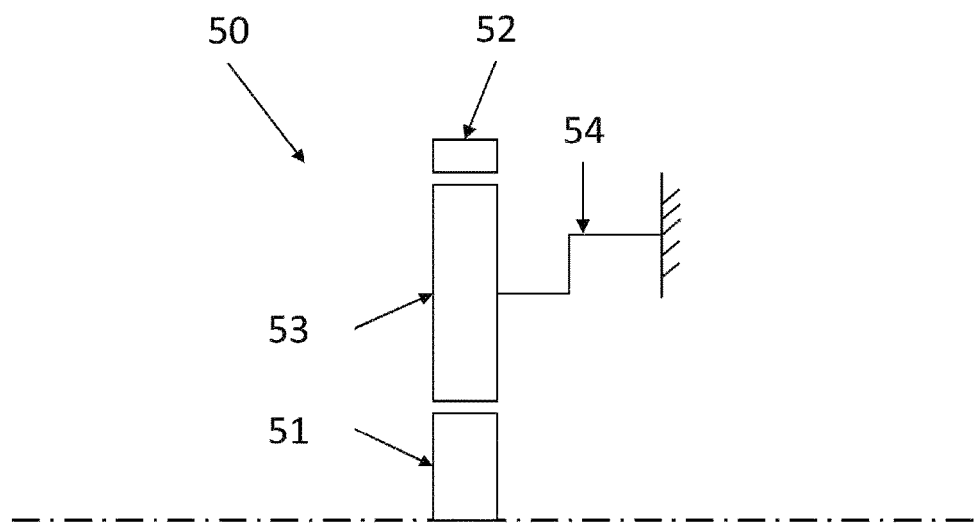
FIG. 2 is a partial and schematic section view of an exemplary embodiment of a planetary mechanical reducer which can be used in a turbomachine comprising a pitch change mechanism in accordance with an embodiment.

Conventionally, the turbomachine comprises, in addition to the propeller, a mechanical reducer 50, as illustrated by FIG. 2 configured to rotationally drive the propeller. The reducer 50 is housed in a casing of the turbomachine. The turbomachine is configured to be fixedly mounted on an aircraft by way of appropriate attaching means, such as a pylon. In the remainder of the text, the term "a stator part of the turbomachine" will denote any part fixedly mounted on a part of the turbomachine which is fixed with respect to the casing which is configured to be connected to the pylon, and "a rotor part of the turbomachine" will denote any part which is movable about an axis when the turbomachine is in operation and which, by definition, is therefore mounted movably with respect to the stator part. By way of example, the stator part comprises the casing of the turbomachine in which are housed means for driving the propeller etc. The rotor part for example comprises the propeller as well as its drive shaft.

Finally, in this application, the upstream and the downstream are defined with respect to the normal direction of flow of the gas in and through the propeller. Moreover, the "axis A" of the hydraulic pump refers to its axis of rotation. The axial direction is equivalent to the direction of the axis A and a radial direction is a direction perpendicular to this axis and passing through it. Moreover, the circumferential (or lateral) direction corresponds to a direction perpendicular to the axis A and not passing through it. Unless otherwise specified, the terms "inner" and "outer" are respectively used with reference to a radial direction such that the inner part or face of an element is nearer to the axis A than the outer part or face of the same element. In addition, an element is considered to be "in a fixed frame of reference" when it is kept rotationally immovable with respect to the axis A, whereas it is considered to be "in a rotating frame of reference" when it is able to be rotationally driven with respect to the axis A.

The reducer 50 is of planetary type and comprises:

- a sun gear 51, centered on an axis of rotation of the reducer and configured to be rotationally driven by a drive input shaft of the turbomachine, a ring gear 52, coaxial with the sun gear 51 and configured to rotationally drive the drive shaft of the propeller about the axis of rotation, and a series of planet gears 53 circumferentially distributed around the axis of rotation of the reducer between the sun gear 51 and the ring gear 52, each planet gear being meshed internally with the sun gear 51 and externally with the ring gear 52. The series of planet gears 53 is mounted on a planet carrier 54 which is fixed with respect to a stator part of the turbomachine.

In a variant, the reducer 50 can be epicyclic, in which case the ring gear 52 is fixedly mounted on a stator part of the turbomachine and the drive shaft is rotationally driven by the planet carrier 54.

Figure 3:
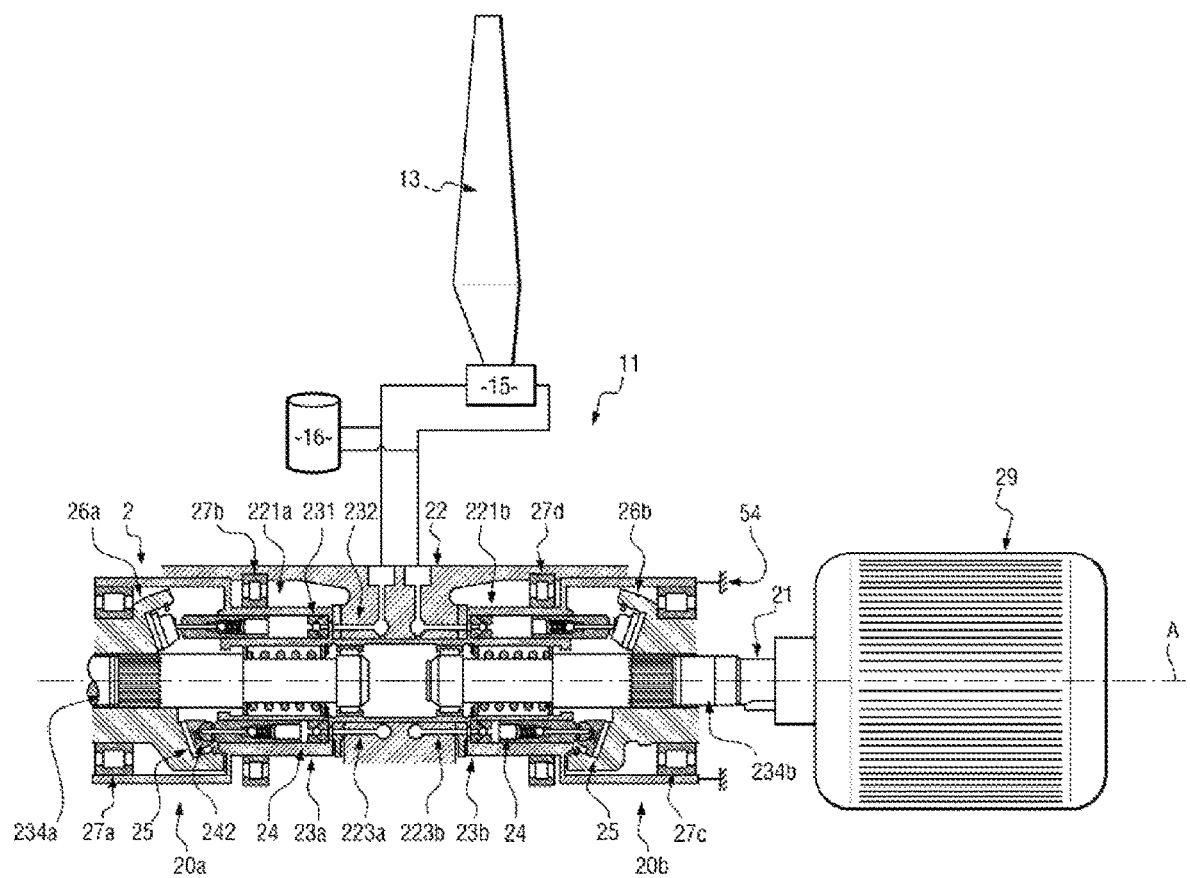
FIG. 3 is a schematic section view of an example of a pitch change mechanism of a propeller.

As illustrated in FIG. 3, the pitch change mechanism comprises an electrohydraulic actuator 11 (EHA for Electro Hydraulic Actuator), configured to actuate an actuator 15 which is mechanically connected to the propeller 13 in order to modify the pitch thereof, a pumping assembly 2 configured to pressurize a fluid (typically oil) and an electric machine 29.

The electric machine 29 is fixedly mounted on the stator part of the turbomachine and comprises an actuating shaft 21 rotationally movable about an axis of rotation A.

The pumping assembly 2 comprises two axial-piston hydraulic pumps 20a, 20b suitable for pressurizing a hydraulic fluid sharing one and the same body 22 rotationally driven by the propeller 13.

Each of the pumps 20a, 20b comprises a barrel 23a (respectively 23b), housed in a cavity 221a (resp. 221b), this latter being entirely or partly filled with hydraulic fluid, and a plate 26a (resp. 26b). In this barrel 23a (resp. 23b) is formed a bore assembly defining cylinders configured to slidably receive pistons 24. The axis of translation of the pistons 24 is substantially parallel to the axis of rotation A. Each piston 24 comprises a sliding pad 25 configured to then bear against the plate 26a (resp. 26b).

The barrel 23a (resp. 23b) of each of the two pumps 20a, 20b and the associated pistons 24 are fixedly connected to the stator part of the turbomachine to prevent their rotation about the actuating shaft 21. The barrels 23, 23b are therefore rotationally immovable about the axis A (so in the fixed frame of reference) The barrels 23a, 23b can in particular by mechanically connected. In an embodiment, when the reducer 50 is of planetary type, the two barrels 23a, 23b are attached securely to the planet carrier 54 of the reducer 50, immobilizing the second barrel. In a variant, when the reducer 50 is of epicyclic type (drive shaft driven by the planet carrier 54), the barrels can be mounted on the ring gear 52.

The two plates 26a and 26b are mounted around the actuating shaft 21 while being inclined with respect to the axis of rotation A and rotationally secured to the actuating shaft 21. The plates 26a, 26b are therefore rotationally driven by the actuating shaft 12. The sliding pads 25 of the pistons 24 are configured to slide freely along the plate 26a (resp. 26b) while bearing against it (constant contact) whatever the angular position of the pistons 24 around the axis of rotation A.

The two barrels 23a, 23b are mounted around the actuating shaft 21. Since the barrels 23a, 23b are in the fixed frame of reference while the actuating shaft 21 is configured to be rotationally driven by the electric machine 29 about the axis A, they each comprise a through hole 234a, 234b configured to receive the actuating shaft 21 of the electric machine 29. The through holes 234a and 234b are coaxial and, where applicable, communicating.

To allow the rotational blocking of the barrel 23a, 23b, the electrohydraulic actuator 11 comprises a first bearing 27a (resp. 27c) configured to support the plate 26a (resp. 26b) of the first pump 20a (resp. of the second pump 20b) and a second bearing 27b (resp. 27d) configured to support the barrel 23a (resp. 23b) of the first pump 20a (resp. of the second pump 20b). The first bearing 27a (resp. 27c) can for example be mounted between the plate 26a (resp. 26b) and the barrel 23a (resp. 23b), in particular at the level of a portion connecting the latter to the fixed frame of reference for the first pump 20a, whereas the second bearing 27b (resp. 27d) is mounted between the barrel 23a, (resp. 23b) and the body 22.

During the operation of the electrohydraulic actuator 11, the two plates 26a, 26b are rotationally driven by the actuating shaft 21 about the axis of rotation A. The two barrels 23a, 23b are fixed. Since the pistons 25 of the two pumps 20a, 20b are constantly bearing on their respective plates 26a, 26b, this rotational movement has the effect of displacing the sliding pads 25 of the pistons 24 along an axis parallel to the axis of rotation A thus generating a to-and-fro movement, the amplitude of which is determined by the inclination of the plates 26a, 26b with respect to the axis of rotation A.

In an embodiment, the discharge holes 232 of the pumps 20a, 20b are adjacent and open into a central area of the pumping assembly 2. The plates 26a, 26b are then each positioned at opposite ends of the pumping assembly 2, while being coaxial to the axis of rotation A. The pumping assembly 2 thus successively comprises, along the axis of rotation A, the first plate 26a, the barrel 23a, the discharge holes 232 of the pump 20a, the annular groove of the pump 20a, the annular groove of the pump 20b, the discharge holes 232 of the pump 20b, the barrel 23b and the second plate 26b. The barrels 23a, 23b are therefore disposed in such a way that the sliding pads 25 of the pistons 24 are directed toward the ends along the axis of rotation A of the pumping assembly 2.

Figure 4:
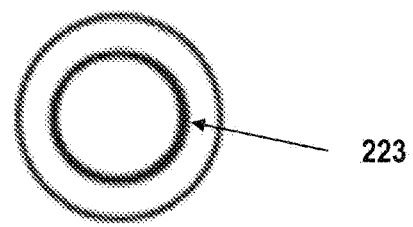
FIG. 4 is a schematic view of an example of an annular groove formed in the body of a pump.

In each of the pumps, the cylinders comprise an intake hole 242 configured to receive hydraulic fluid coming from the cavity 211a, 211b as well as a discharge hole 232 configured to discharge the hydraulic fluid contained in the cylinder to the actuator 15 of the propeller by way of an annular groove 223a, 223b formed in the body 22 (FIG. 4). The use of such an annular groove in fluid communication with the discharge holes 232 of the cylinders allows the pump to operate whatever the angular position of the body 22 and therefore of the discharge holes 232 during the movement of the pistons 24.

Figure 5:
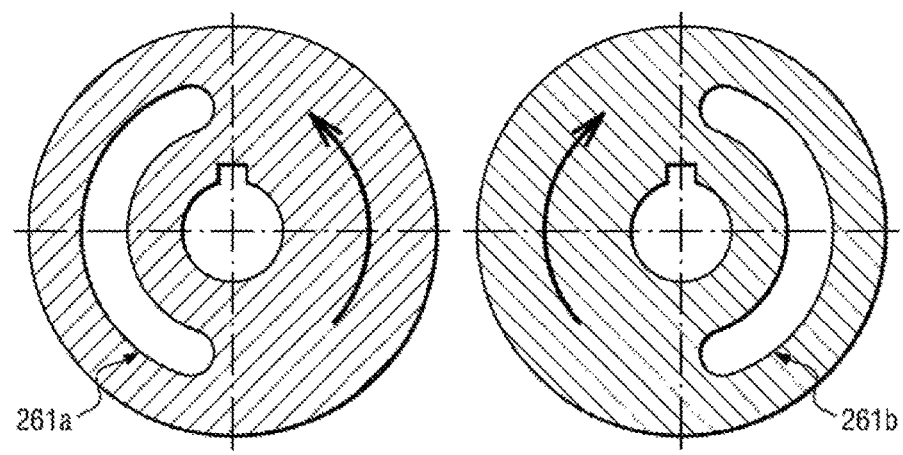
FIG. 5 is a schematic view of an example of a curved intake opening formed in the plate of a pump.
Figure 7:
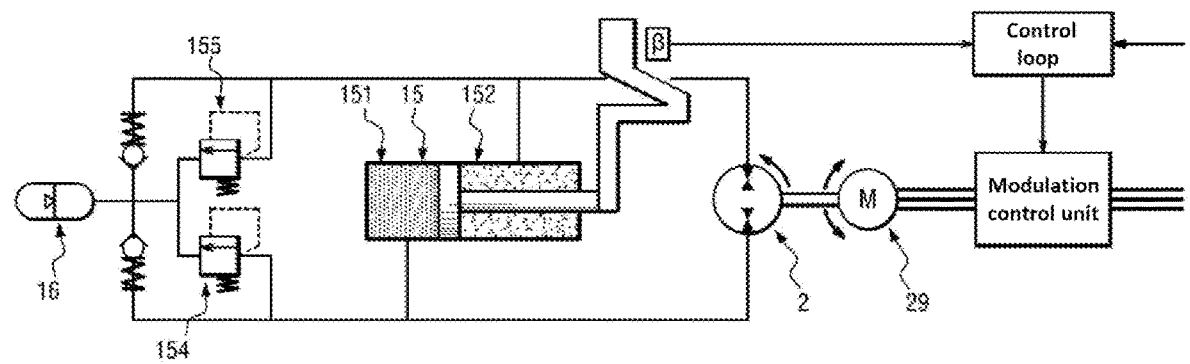
FIG. 7 is a schematic view of a pitch change mechanism of a propeller according to an embodiment.

Furthermore, the plate 26a of the first of the pumps 20a comprises a curved intake opening 261a (FIG. 5) extending circumferentially with respect to the axis of rotation A. This curved opening is configured to allow the circulation of the hydraulic fluid from the cavity 221a to the cylinders of the first of the pumps 20a when the plate 26a of the pump 20a is driven in a first direction of rotation about the axis of rotation A.

Symmetrically, the plate 26b of the second of the pumps 20b comprises a curved intake opening 261b extending circumferentially with respect to the axis of rotation A. This curved opening is configured to allow the circulation of the hydraulic fluid from the cavity 221b to the cylinders of the second of the pumps 20b when the plate 26b of said pump 20b is driven in a second direction of rotation about the axis of rotation A which is opposite to the first direction of rotation.

For example, each curved intake opening 261a, 261b extends circumferentially with respect to the axis of rotation A such as to form a semicircle. The curved intake opening 261a is then symmetrical with respect to the curved intake opening 261b, i.e. they are diametrically opposed.

The pumps 20a, 20b further comprise shutting means configured to shut off the intake hole 242 of the cylinders to prevent the hydraulic fluid from entering into the cylinders when the pump 20a, 20b must be non-discharging, i.e. when the axis of rotation rotates in the second direction for the first pump 20a and in the second direction for the pump 20b. In a first variant embodiment, the shutting means comprise an intake valve mounted at the intake hole 242 of each cylinder. Each intake valve has an open configuration, in which the intake valve is open and allows the hydraulic fluid to circulate from the barrel to the cylinder, and a closed configuration, in which the intake valve closes the cylinder and prevents the circulation of hydraulic fluid between the cylinder and the corresponding barrel 23a, 23b. In the closed configuration, the intake valve thus makes it possible to block the return of pressurized hydraulic fluid coming from the cylinder in the direction of the barrel 23a, 23b. Since the barrels 23a, 23b are rotationally movable, the intake valves 241 are preferably mounted inside the cylinders and automatically position themselves (passively) in the open or closed configuration according to the position of the piston 24 in the cylinder. Where applicable, the intake valves 241 can in particular be mounted near the sliding pad 25.

In a variant embodiment, which can be combined with the first variant, the function of the shutting means is fulfilled directly by the plate 26a, 26b of the pump 20a, 20b. For this purpose, each plate 26a, 26b can be configured such that its surface shuts off the intake hole 242 of the cylinders when the plate 26a is driven in the direction of rotation in which the corresponding pump 20a, 20b is non-discharging (i.e. the second direction of rotation in the case of the first pump 20a and the second direction of rotation in the case of the second pump 20b). For example, the surface of each plate 26a, 26b may comprise the curved intake opening 261a, 261b, which extends circumferentially with respect to the axis of rotation A over a first circle half such as to form a semicircle, and be solid or even comprise a circumferential protuberance with respect to the axis of rotation A over the second circle half.

Hence, only one of the two pumps 20a, 20b is discharging, according to the direction of rotation of the actuating shaft 21. Specifically, when the actuating shaft rotates in the first direction of rotation, the intake holes 242 of the cylinders of the first pump 20a are located facing the curved intake opening 261a when the pistons are in the intake phase, which allows the hydraulic fluid to enter the bores of the barrel 23a. On the other hand, the intake holes 242 of the cylinders of the second pump 20b are located facing the solid part of the plate 26b, which shuts off the intake holes 242 and thus does not allow the entry of hydraulic fluid into the bores of the barrel 23b. Thus, only the first pump 20a is discharging.

Conversely, when the actuating shaft rotates in the second direction of rotation, the intake holes 242 of the cylinders of the second pump 20b are located facing the curved intake opening 261b when the pistons are in the intake phase, which allows the hydraulic fluid to enter the bores of the barrel 23b. On the other hand, the intake holes 242 of the cylinders of the first pump 20a are located facing the solid part of the plate 26a, which shuts off the intake holes 242 and thus does not allow the entrance of hydraulic fluid into the bores of the barrel 23a. Thus, only the second pump 20b is discharging.

In an embodiment, each cylinder comprises means configured to shut off or open the discharge hole 232. In an embodiment, these means comprise a discharge valve 231 mounted at the discharge hole 232. Each discharge valve 231 has an open configuration, in which the discharge valve 231 is open and allows the hydraulic fluid to flow from the cylinder to the annular groove, and a closed configuration, in which the discharge valve 231 shuts off the cylinder and prevents the circulation of hydraulic fluid between the cylinder and the annular groove. In the closed configuration, the discharge valve 231 thus makes it possible to block the return of pressurized hydraulic fluid coming from the annular groove 223a, 223b in the direction of the cylinders. Since the body 22 is rotationally movable, the discharge valves 231 are preferably mounted inside the cylinders and position themselves automatically (passively) in the open or closed configuration according to the position of the piston 24 in the cylinder.

The actuator 15 preferably comprises a double-action cylinder comprising a first chamber 151 and a second chamber 152. The actuator 15 is moreover rotationally secured to the propeller 13 and connected thereto such that the actuation of the actuator 15 (by successive filling and emptying of the first and second chambers) has the effect of modifying the pitch of the propeller 13 in one direction or the other.

Figure 6:
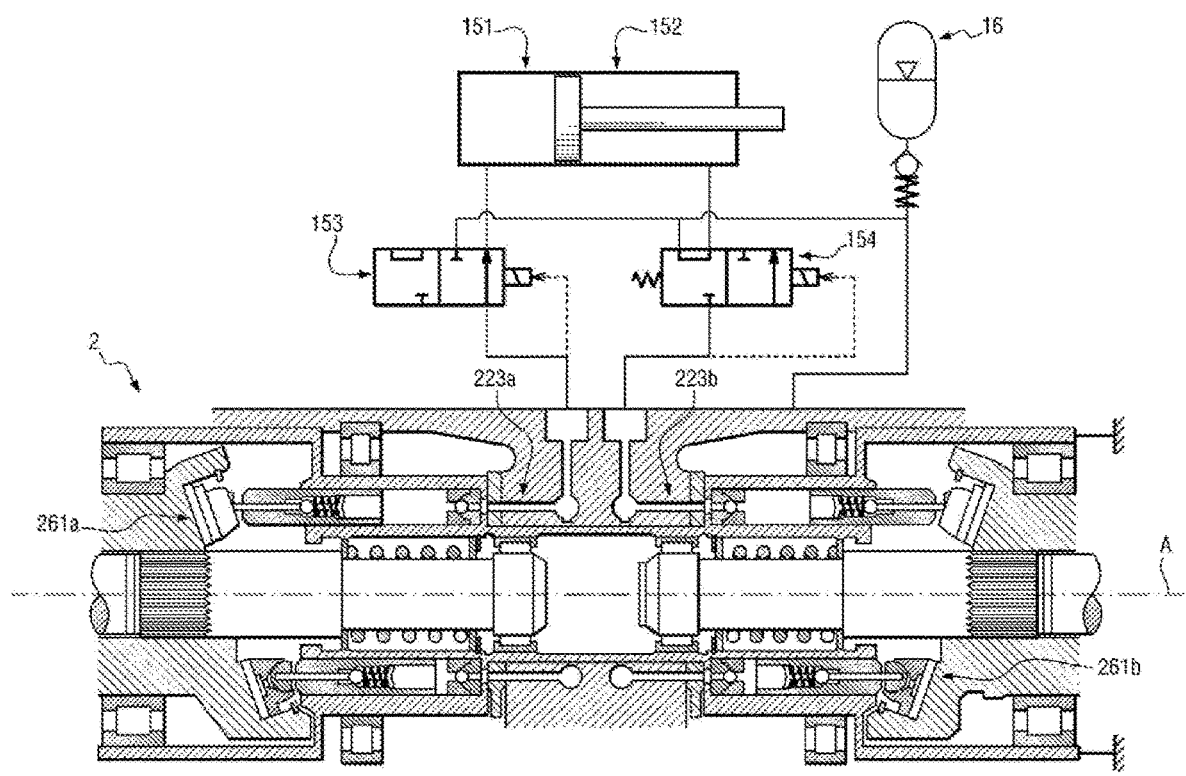
FIG. 6 is a schematic view of a pitch change mechanism of a propeller according to an embodiment.

With reference to FIG. 6, the electrohydraulic actuator 11 further comprises a two-way valve 153, 154 having two positions fluidly connected to each pump 20a, 20b and a hydraulic accumulator 16 which is mounted in the rotating frame of reference of the propeller. Each valve 153, 154 is controlled by the pressure of the hydraulic fluid at the annular groove of the corresponding pump 20a, 20b between a first, so-called actuating position, in which the valve 153, 154 puts one of the chambers of the actuator 15 in fluid communication with the annular groove of the corresponding pump, and a second position in which the valve 153, 154 puts this same chamber of the actuator 15 in fluid communication with the hydraulic accumulator. The valve 153, 154 places itself in the first position when the pressure at the outlet of the pump 20a, 20b overcomes the stiffness of the spring associated with this valve 153, 154. Each valve 153, 154 is thus displaced between the first position and the second position passively as a function of the pressure of the hydraulic fluid at the outlet of the corresponding pump 20a, 20b, which depends on the direction of rotation of the actuating shaft 21.

More precisely, the first valve 153, which is controlled by the pressure at the outlet of the first pump 20a, is configured to put the first chamber 151 of the actuator 15 in fluid communication either with the annular groove of the first pump 20a when the actuating shaft 21 rotates in the first direction of rotation (the first pump 20a discharging pressurized fluid via the annular groove), or with the hydraulic accumulator 16 when the actuating shaft 21 is driven in the second direction of rotation. Similarly, the valve 154 fluidly connected to the second pump 20b is configured to put the second chamber 152 of the actuator 15 in fluid communication either with the annular groove of the second pump 20b when the actuating shaft 21 rotates in the second direction of rotation (the second pump 20b discharging pressurized fluid via the annular groove), or with the hydraulic accumulator 16 when the actuating shaft rotates in the first direction of rotation.

The actuation of the actuating shaft 21 of the pumping assembly 2 in the first direction of rotation by the electric machine 29 thus has the effect of filling the first chamber 151 of the actuator 15 and emptying its second chamber 152, whereas the actuation of the second actuating shaft 21 in the second direction of rotation has the effect of filling the second chamber 152 of the actuator 15 and emptying its first chamber 151. The pitch of the propeller, which depends on the fluid pressure in the first chamber 151 and in the second chamber 152 of the actuator 15, can therefore be entirely controlled by the electric machine 29. Such an operating mode thus makes it possible to dispense with the need to use a flow switching valve to select the chamber of the actuator to which the pressurized hydraulic fluid is directed.

Furthermore, since the pitch is directly controlled by the hydraulic fluid produced by the hydraulic pump 20, which depends on the displacement speed of the pistons 24, the control of the pitch of the propeller 13 can be embodied using torque slaving of the electric machine 29. In an embodiment, the electric machine 29 is an asynchronous machine, such a machine not inducing any resistive torque in the event of short-circuits and thus reducing the risk of fire.

Note here that the pumping assembly 2 includes only passive actuating means, the valves being controlled solely by the pressure at the outlets of the pumps 20a, 20b. No controller or electrical system is therefore necessary, apart from the electrical means needed to control the electric motor 29.

Conventionally, the pitch change mechanism can further comprise a feathering system which is functional in the event of an absence of hydraulic fluid pressure. In an embodiment, the feathering system comprises counterweights of flyweight type.

This configuration of the pitch change mechanism thus makes it possible to dispense with the use of an oil transfer bearing (OTB), thus eliminating the risk of leaks and the associated dimensioning restrictions associated with the pitch actuating system and with the lubrication circuit of the turbomachine. The circuit is moreover independent of the lubrication unit and more generally of the lubrication circuit of the turbomachine. Since the solution for which provision is made is based on a closed hydraulic circuit independent of the turbomachine lubrication circuit, there are, in particular, no more feeding problems according to flight maneuvers. In particular, the pressure delivered by the hydraulic pump 20 can reach significant levels (in the order of 300 bars), which simplifies the dimensioning of the actuator 15. Also in particular, the driving of the pump is done by an electric motor. It is therefore possible to envision a supply by various sources of electrical power, rendering this system independent of the speed of rotation of the HP body of the turbomachine.

Note that the feathering here includes only passive actuating means, the safety valve 18 and the additional valve 19 being controlled solely by the pressure in the hydraulic circuit of the pitch change mechanism. No controller or electrical system is therefore necessary, apart from the electrical means needed to control the flow switching valve and the electric motor 29.

The invention claimed is:

1. A pitch change mechanism for a propeller of a turbomachine the pitch change mechanism comprising an electrohydraulic actuator comprising:
an electric machine fixedly configured to be mounted on a stator part of a turbomachine and comprising an actuating shaft rotationally movable about an axis of rotation;
a pumping assembly comprising two axial-piston hydraulic pumps suitable for pressurizing a hydraulic fluid, each hydraulic pump comprising:
a barrel housed in a cavity filled entirely or partly with hydraulic fluid, the barrel being fixedly connected to the stator part of the turbomachine to prevent its rotation about the actuating shaft;
a set of cylinders formed inside the barrel each cylinder housing a piston movable in translation in the cylinder and comprising an intake hole configured to receive hydraulic fluid coming from the cavity, and a discharge hole configured to send hydraulic fluid to an actuator of the propeller;
a plate inclined with respect to the axis of rotation and rotationally secured to the actuating shaft, each piston bearing on a surface of the plate;
wherein the plate of a first of the pumps comprises a curved intake opening extending circumferentially with respect to the axis of rotation and configured to allow the circulation of the hydraulic fluid from the cavity to the cylinders of the first of the pumps when the plate of said pump is driven in a first direction of rotation, and the plate of a second of the pumps comprises a curved intake opening extending circumferentially with respect to the axis of rotation and configured to allow the circulation of the hydraulic fluid from the cavity to the cylinders of the second of the pumps when the plate of said pump is driven in a second direction of rotation opposite to the first direction of rotation.

2. The mechanism of claim 1 wherein, when the plate of the first pump is driven in the second direction of rotation, the intake hole of the cylinders is shut off by the surface of the plate of the first pump and, when the plate of the second pump is driven in the first direction of rotation, the intake hole of the cylinders is shut off by the surface of the plate of the second pump.

3. The pitch change mechanism of claim 1, wherein the discharge holes of the pumps are adjacent and open into a central area of the pumping assembly.

4. The pitch change mechanism of claim 1, wherein each cylinder further comprises a discharge valve mounted on the discharge hole and configured to block circulation of the hydraulic fluid of the actuator in the direction of the cylinder.

5. The pitch change mechanism of claim 1, further comprising an annular groove formed in the body of each pump, said annular groove being in fluid communication with the discharge holes of the cylinders of the corresponding pump.

6. The pitch change mechanism of claim 5, wherein the actuator of the propeller comprises two chambers, a first of the two chambers being in fluid communication with the annular groove of the first pump, a second of the two chambers being in fluid communication with the annular groove of the second pump.

7. The pitch change mechanism of claim 6, further comprising:
a first hydraulic valve configured to put the first chamber of the actuator in fluid communication either with the annular groove of the first pump when the actuating shaft is driven in the first direction of rotation, or with a hydraulic accumulator when the actuating shaft is driven in the second direction of rotation; and
a second hydraulic valve configured to put the second chamber of the actuator in fluid communication either with the annular groove of the second pump when the actuating shaft is driven in the second direction of rotation or with the hydraulic accumulator when the actuating shaft is driven in the first direction of rotation.

8. The pitch change mechanism of claim 7, wherein the first hydraulic valve and the second hydraulic valve are each controlled by a pressure at the discharge hole of the first pump and of the second pump, respectively.

9. The pitch change mechanism of claim 1, wherein the electric machine is an asynchronous machine.

10. The pitch change mechanism of claim 1, wherein a pitch of the propeller is controlled by torque control of the electric machine.

11. A turbomachine comprising a propeller, an actuator which is mechanically connected to the propeller and a pitch change mechanism of claim 1 configured to actuate the actuator.

12. An aircraft comprising at least one turbomachine as claimed in claim 11 connected to the aircraft by way of a pylon.

\* \* \* \* \*